Oct. 30, 1928.

G. A. KLIMEK 1,689,244

HYDRAULIC POWER TRANSMITTER

Filed Feb. 7, 1925

Inventor
Gustav A. Klimek
By his Attorneys

Patented Oct. 30, 1928.

1,689,244

UNITED STATES PATENT OFFICE.

GUSTAV A. KLIMEK, OF EAST RUTHERFORD, NEW JERSEY, ASSIGNOR TO TURBINE PATENTS CORPORATION, OF NEW YORK, N. Y., A CORPORATION OF DELAWARE.

HYDRAULIC-POWER TRANSMITTER.

Application filed February 7, 1925. Serial No. 7,468.

This invention relates to hydraulic power transmitters of that type in which the driving and driven members have passages or vanes for the liquid, and the two members are so juxtaposed that liquid may circulate and act as the power transmitting medium between the members.

An apparatus of this type has many advantages when used for the transmission of power between certain prime movers and the driving apparatus, as for instance between the engine and the driven wheels of an automobile. In such a construction it acts to cushion all slight accelerations and decelerations of either the engine or the driven parts, and prevents the transmission of jar or shock from either to the other. This is as important at high speed as at low speed. The ordinary clutch transmission and differential does not permit any such cushioning at any speed.

It has been proposed to use a hydraulic power transmitter in connection with a positive clutch in a motor vehicle, but so far as I know the arrangement has been such that the two were in parallel and the hydraulic power transmitter was used only in starting, or at low speed, and ceased to function when the positive clutch was engaged for direct drive or high speed operation.

In my improved apparatus the hydraulic power transmitter and mechanical or positive clutch are arranged in series, and any and all driving is through both, for all speeds from the lowest to the highest. The hydraulic power transmitter performs its shock cushioning function at all speeds, while the mechanical clutch may be disengaged for gear shifting, as in present day practice.

As it is not necessary that there be more than a slight slippage at high speeds to cushion shocks, and give even uniform operation, and as the clutch does not have to resist shocks or jars resulting from sudden accelerating or decelerating movements of either the engine or the vehicle, both the clutch and the hydraulic power transmitter may be made smaller than has heretofore been found necessary, and the two may be arranged concentrically and combined with the flywheel in a space little if any larger than that occupied by the ordinary flywheel and clutch.

A further object of my invention is to provide for the effective sealing of the fluid of the transmitter so that it cannot reach the clutch faces or interfere with the operation of the latter.

Other objects and advantages will be pointed out hereinafter or will be apparent from a consideration of the preferred embodiment illustrated in the accompanying drawings. It is to be understood that these drawings are to be considered in an illustrative rather than in a limiting sense.

In the construction illustrated I have combined my improved construction with an engine flywheel 10 which may be provided with the usual annular row of bolt holes 11 for attachment to the flange of a drive shaft. The periphery of the flywheel may have the usual gear teeth 12 intended primarily for engagement with the gear of an engine starter, but obviously adapted for use in driving any parts which are not to be driven through the clutch and hydraulic power transmitter.

Figure 1:
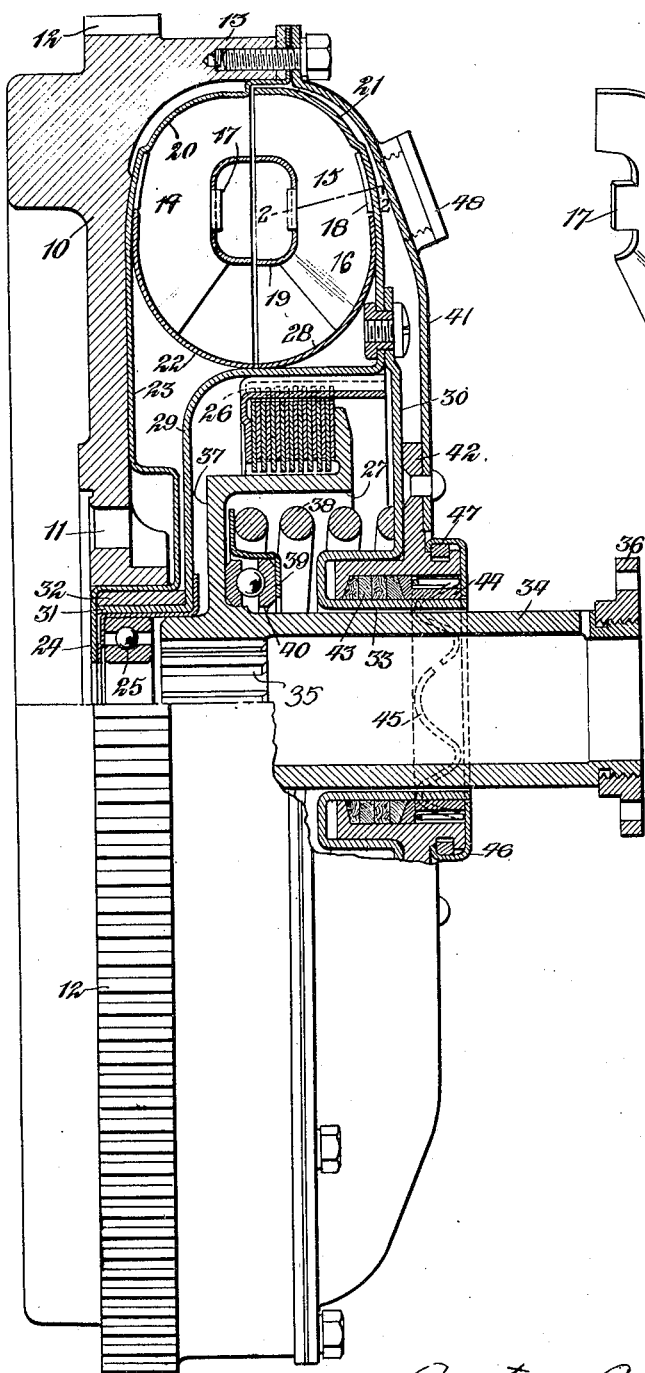
Fig. 1 is a central longitudinal section of a device constructed in accordance with my invention.
Figure 3:
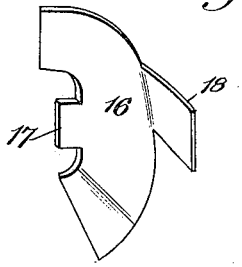
Fig. 3 is a perspective view of one of the vanes or blades of the hydraulic transmitter.
Figure 2:
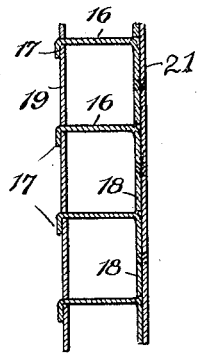
Fig. 2 is a sectional detail on the line 2—2 of Fig. 1.

The flywheel is provided with a peripheral substantially cylindrical flange 13 which cooperates with the main body of the flywheel to form a chamber within which is mounted the hydraulic power transmitter and the clutch. The hydraulic power transmitter or fluid clutch includes a driving member 14 and a driven member 15, each having an annular set of approximately radially extending fluid passages, the inlets to the passages of the driven member being juxtaposed to the outlets for the passages in the driving member, and the outlets for the passages in the driven member being juxtaposed to the inlets for the passages in the driving member. The passages extend in an approximately radial direction, and in the form shown the two members have their inlets and outlets facing approximately axially in a plane at right angles to the axis of rotation. The blades or vanes may be constructed of sheet metal, and of substantially the form shown in Fig. 3. Each vane or blade has a body portion 16 cut to approximately U-shape, and provided with lugs or flanges 17 and 18 upon the outer and inner edges. The lugs 17 on the inner edges of the several vanes or blades may extend through apertures in an annular inner casing member 19, and may be bent or riveted over as shown in Fig. 2 to effectively connect the parts. The outer lugs or flanges 18 may be bent to lie in a plane substantially at right angles to the plane of the body portion of the vane, and to act as spacers, as shown particularly in Fig. 2. These outer flanges 18 may be spot-welded to the two outer casing members 20 and 21, which combine with the inner casing members 19 to define the main chamber for the operating liquid.

The driving member 14 is rigidly secured to the flywheel. The casing member 20 may have its outer peripheral edge offset, and formed as a flange which may be bolted or otherwise rigidly secured to the flange 13 of the flywheel. The casing 20 may include two sections, one of which, 22, forms the inner portion of the wall of the fluid chamber, while another portion 23, acts as a liner for the chamber or cavity in the flywheel, and is welded or otherwise rigidly secured to the inner or central portion of the flywheel. Preferably it has a portion spaced from the wall of the flywheel opposite to the bolt holes 11, so as to receive the heads of the bolts. The extreme inner edge of this liner wall 23 may form a flange 24 opposite to the end of a ball bearing 25 mounted in the flywheel at the center of the latter to receive the end portion of the driven shaft.

The radial dimensions of the fluid chamber formed by the casing members 20, 21, and 19, is very materially less than the radius of the flywheel, so that there is formed an annular chamber at the center of the flywheel and encircled by the hydraulic power transmitter. Within this space is mounted the positive or mechanical clutch. As shown, the clutch is of the multiple-disk type, and has two concentric cylindrical walls 26, 27, between which are mounted the several disks of the clutch, each alternate disk being held against rotation in respect to the outer wall 26, and the remaining disks being held against rotation in respect to the inner wall 27. The clutch is mounted in a chamber which is sealed fluid-tight from the liquid in the hydraulic power transmitter. As shown, the outer casing 21 of the driven member has a section 28 corresponding to the section 22 of the driving member, and constituting the inner wall of the fluid chamber. Rigidly connected to the outer casing member 21 are a pair of walls 29 and 30 which diverge to form therebetween the chamber for the multiple disk clutch. The wall 29 extends axially within the hydraulic power transmitter and is rigidly secured to the outer wall member 26 of the multiple disk clutch. Beyond the clutch the wall extends inward radially and thence axially to form a sleeve 31 constituting a housing and support for the outer race ring of the ball bearing 25. Between the sleeve 31 and the adjacent encircling sleeve part of the wall 23, there is provided a packing ring or gasket 32 preferably of Babbitt metal to form an adequate support for the sleeve 31 and permit relative rotation of this sleeve in respect to the flywheel 10.

The other wall 30 of the driven member extends inward axially and is provided with a sleeve 33 through which extends the sleeve 34 of the clutch operating mechanism. This sleeve 34 encircles the driven shaft (not shown) and is provided with flanges or teeth 35 permitting axial movement of the sleeve in respect to the driven shaft but to prevent relative rotation. The sleeve 34 at its outer end is provided with any suitable means, as for instance a collar 36 for moving the sleeve endwise. At its inner end the sleeve 34 has a flange 37 which connects it to the clutch wall 27, and may if desired be formed integral with both of these parts.

The inner cylindrical wall 27 of the clutch forms the outer or peripheral wall of a chamber within which is mounted the clutch spring 38. This spring has one end seating against the wall 30 and the other end seating against a collar 39 which is spaced from the flange 37 by a ball bearing 40. The spring normally tends to force the sleeve 34 axially and hold the disks of the clutch in engaged or driving position, whereas by pulling on the sleeve 34 by means of a clutch pedal or other suitable means, the spring may be compressed and the disks of the clutch separated to permit free relative rotation of the driven and driving clutch parts.

The device is provided with an outer casing member 41 which may have its periphery secured and sealed to the peripheral flange 13 of the flywheel, and have at its inner edge a collar 42 provided with a chamber for gaskets or packing rings 43. These are mounted between the collar 42 and the sleeve 33 of the wall 30, so as to prevent the escape of any fluid from the space between the wall 30 which is connected to the driven member, and the wall 41. The gaskets 43 are preferably held under compression by a collar 44 and a spring 45, the latter seating against an outer cap 46. The spring shown is disposed in an annular chamber, and is of stiff wire bent back and forth in an axial direction to form lobes engaging alternately with the cap 46 and the collar 44. To hold the cap 46 in place and to effectively seal the parts, there may be employed an expansible split ring 47 mounted in opposed grooves in the collar 42 and cap 46.

It will be noted that in my improved construction the driving member 14 of the hydraulic power transmitter is rigidly connected to the driving flywheel, and that the driven member 15 of the hydraulic power transmitter is connected to one element of the clutch. The other element is connected to the sleeve 34 which is keyed to the driven shaft. Thus the hydraulic power transmitter or fluid clutch is in series with the mechanical or positive clutch. At very low speed such as idling there is preferably enough slippage in the fluid clutch so that the mechanical clutch may be left engaged and the driven shaft remain at rest. As the speed of the engine picks up the slippage will become less in respect to the speed of rotation, and the power will be positively transmitted through the fluid clutch and the mechanical clutch to the driven member. The fluid clutch will cushion all shocks and jars at all speeds, while the mechanical clutch may be disengaged at any time to facilitate gear shifting, particularly for introducing reverse gear drive. The parts may be so proportioned that transmission gearing for different speeds is not necessary. In any event, a lesser number of transmission gear ratios is required.

The chamber within which is confined the operating liquid of the hydraulic power transmitter or fluid clutch is sealed to not only prevent the escape of fluid, but to prevent any of it from gaining access to the clutch faces of the mechanical clutch. It will be noted that in case there is any leakage of fluid past the gasket 32 at one end, or past the gaskets 43 at the other end, it will be delivered outside of the main casing and cannot enter the chamber containing the mechanical clutch. The fluid of the chamber may be withdrawn or additional fluid admitted through any suitable filling opening, as for instance an opening in the casing wall 41 normally closed by a screw plug 48.

As previously noted the mechanical clutch being in series with the fluid clutch, is protected from the jars and sudden strains of irregular engine operation or varying torque on the driven wheel, and therefore the mechanical clutch may be made comparatively small and housed within the hydraulic clutch, and as the latter need take care of only comparatively small slippage it also may be made of comparatively small radial distance from its inner to its outer peripheries. By making the mechanical clutch at the center and the fluid clutch outside of it, the latter gets the maximum effect of the action of centrifugal force on the fluid in the driving member.

The entire construction is so designed that it may be substituted in place of the combined flywheel and clutch of certain standard makes of automobile. Certain changes in details of construction may be desirable where the device is to be used in connection with other parts especially designed for use therein. As previously noted one feature is the arrangement whereby the fluid of the fluid clutch is kept out of contact with the parts of the mechanical clutch. The walls 29 and 30 each engage with the bearings of the outer casing formed by the flywheel 10 and wall 41, so as to form a compartment for the mechanical clutch. The turbine rotor 15 which is juxtaposed to the centrifugal pump impeller 14 is carried by one side of the partition wall 21, 29, 30, while one element 26 of the mechanical clutch is carried by the same wall and upon the opposite side thereof.

Having thus described my invention, what I claim as new and desire to secure by Letters Patent is:

1. In combination a fly wheel including a body portion and a casing member secured to the periphery thereof to define a chamber, a fluid impeller within the fly wheel and secured to the latter with fluid inlets and outlets facing toward said casing member, a fluid driven member within said casing member with fluid inlets and outlets facing toward the outlets and inlets respectively of said impeller, a partition engaging said fly wheel adjacent to the center of the latter and secured to said fluid driven member, and a mechanical clutch encircled by said partition and having a clutch part secured to said partition.

2. In combination, a fly wheel including a body portion and a casing member secured to the periphery thereof, said fly wheel and casing members being concave to define a chamber partly within the fly wheel and partly within the casing member, a centrifugal pump impeller within the fly wheel part of the chamber and secured to said fly wheel with fluid inlets and outlets facing toward said casing member, a fluid driven member within the other part of said chamber with fluid inlets and outlets facing toward the outlets and inlets respectively of said impeller, a second driven member projecting through said casing member and a mechanical clutch for detachably connecting said fluid driven member and said second driven member.

3. In combination a rotatable casing having aligned packings in opposite end walls thereof, a member within said casing having parts engaging with said packings, and rotatable in respect thereto, fluid operated driving connections between said casing and said member upon one side of said member, and a mechanical clutch upon the other side of said member and having its driving part connected to said member.

4. In combination a rotatable casing having aligned packings in opposite end walls thereof, a member within said casing having parts engaging with said packings, and rotatable in respect thereto, a hydraulic power transmitter having its driving part connected to said casing and its driven part upon one side of said member and connected thereto, and a mechanical clutch having its driving part upon the other side of said member and connected thereto and its driven part extending through one of said packings.

5. In combination a rotatable casing having aligned packings in opposite end walls thereof, a member within said casing having parts engaging with said packings, and rotatable in respect thereto, a hydraulic power transmitter in said casing at one side of said member for transmitting power from the casing to said member, and means within said casing upon the other side of said member for connecting said member to a driven part.

6. In combination a rotatable casing having aligned packings in opposite end walls thereof, a member within said casing having parts engaging with said packings, and rotatable in respect thereto, a hydraulic power transmitter in said casing at one side of said member for transmitting power from the casing to said member, and a mechanically actuated clutch within said casing upon the other side of said member for connecting said member to a driven part.

7. In combination a rotatable casing having aligned packings in opposite end walls thereof, a member within said casing having parts engaging with said packings, and rotatable in respect thereto, and subdividing the casing into two concentric compartments, a hydraulic power transmitter in the outer compartment for transmitting power to said member from said casing, and a mechanical clutch in the inner compartment for transmitting power from said member.

8. A flywheel having a packing at the center thereof, an annular wall having its outer portion secured to the periphery of the flywheel, its intermediate portion spaced from said flywheel to form a chamber, and its central portion provided with a packing, a member rotatable within said chamber and having sleeve portions engaging with said packings, a centrifugal pump impeller secured to said flywheel, a turbine rotor secured to said member and juxtaposed to said impeller, a mechanical clutch having its driving part secured to the inner surface of said member between said packings, and a driven part axially movable in respect to the driving part, and having a sleeve projecting through one of said packings.

9. A flywheel having a packing at the center thereof, an annular wall having its outer portion secured to the periphery of the flywheel, its intermediate portion spaced from said flywheel to form a chamber, and its central portion provided with a packing, a member rotatable within said chamber and having sleeve portions engaging with said packings, a centrifugal pump impeller secured to said flywheel, a turbine rotor secured to said member and juxtaposed to said impeller, a mechanical clutch having its driving part secured to the inner surface of said member between said packings, and a driven part axially movable in respect to the driving part, and having a coil spring encircled by said driven part and engaging with the latter and with said member adjacent to one of said packings for normally holding the clutch in engaged position.

10. In combination a rotatable casing having aligned packings in opposite end walls thereof, a member within said casing having parts engaging with said packings, and rotatable in respect thereto, a clutch disposed between said packings and having its driving part connected to said member, an annular series of substantially radially extending blades secured to said member upon one side thereof, and a similar annular series of blades secured to said casing and juxtaposed to said first mentioned series for transmitting power to said member by the action of fluid upon the rotation of the casing.

Signed at New York city, in the county of New York and State of New York, this 31st day of January A. D. 1925.

GUSTAV A. KLIMEK.